United States Patent [19]
Schilbe et al.

[11] Patent Number: 6,132,520
[45] Date of Patent: *Oct. 17, 2000

[54] REMOVAL OF THERMAL BARRIER COATINGS

[75] Inventors: John E. Schilbe, Whitehall; Joel L. Cockerill, Montague; Kenneth S. Murphy; Bruce M. Warnes, both of Muskegon, all of Mich.

[73] Assignee: Howmet Research Corporation, Whitehall, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/126,583

[22] Filed: Jul. 30, 1998

[51] Int. Cl.[7] ................................ B08B 9/00; B05D 1/40; B05D 1/36; C03C 23/00
[52] U.S. Cl. ........................... 134/2; 134/22.17; 427/331; 427/404; 427/419.2
[58] Field of Search .................... 134/22.17, 2; 428/623; 419/8; 205/192; 427/331, 404, 419.2

[56] References Cited

U.S. PATENT DOCUMENTS

| | | | |
|---|---|---|---|
| 4,073,662 | 2/1978 | Borom | 134/2 |
| 4,552,198 | 11/1985 | Mills et al. | 164/122.2 |
| 4,569,384 | 2/1986 | Mills | 164/131 |
| 4,576,874 | 3/1986 | Spengler et al. | 428/623 |
| 4,721,549 | 1/1988 | Bogenschutz | 156/663 |
| 4,889,589 | 12/1989 | McComas | 156/646 |
| 5,028,385 | 7/1991 | Baldi | 419/8 |
| 5,507,306 | 4/1996 | Irvine et al. | 134/166 |
| 5,542,982 | 8/1996 | Terada et al. | 134/5 |
| 5,614,054 | 3/1997 | Reeves et al. | 156/33 |
| 5,643,474 | 7/1997 | Sangeeta | 216/96 |
| 5,678,583 | 10/1997 | Conroy et al. | 134/133 |
| 5,679,270 | 10/1997 | Thornton et al. | 216/100 |
| 5,685,917 | 11/1997 | Sangeeta | 134/2 |
| 5,788,823 | 8/1998 | Warnes et al. | 205/192 |

FOREIGN PATENT DOCUMENTS 2 266 677  10/1993  United Kingdom.

*Primary Examiner*—Jill Warden
*Assistant Examiner*—Yolanda E. Wilkins
*Attorney, Agent, or Firm*—Edward J. Timmer

[57] ABSTRACT

A gas turbine engine component having a thermal barrier coating is immersed in an inorganic hydroxide bath having a high concentration of alkali or alkaline earth hydroxide with the bath at ambient (atmospheric) pressure and elevated temperature for a time sufficient to effect rapid detachment of the thermal barrier coating for removal from the substrate. The component then optionally can be immersed in a water bath to remove any remaining thermal barrier coating. The thermal barrier coating is removed without detectable damage to the substrate or any bondcoat present thereon.

12 Claims, 5 Drawing Sheets

CMSX-4
Base Alloy
Before Molten Caustic

CMSX-4
Base Alloy
After Molten Caustic

CMSX-4
Base Alloy
Before Molten Caustic

CMSX-4
Base Alloy
After Molten Caustic

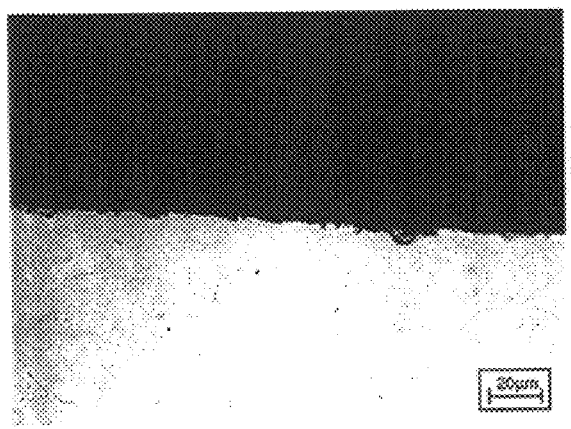 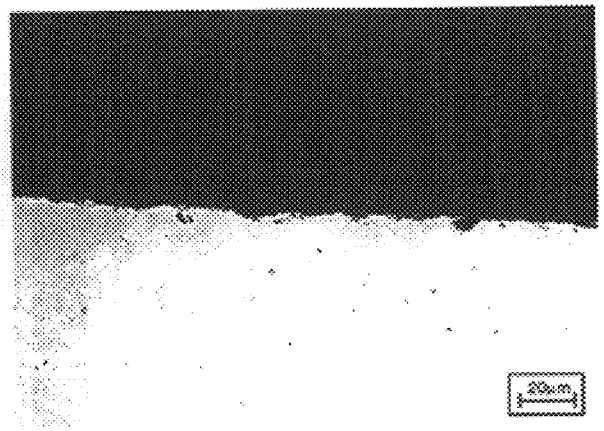
Figure 2A.
Rene' N5
Base Alloy
Before Molten Caustic
Figure 2B.
Rene' N5
Base Alloy
After Molten Caustic CMSX-4
MDC-150L With TBC
Before Molten Caustic CMSX-4
MDC-150L Without TBC
After Molten Caustic

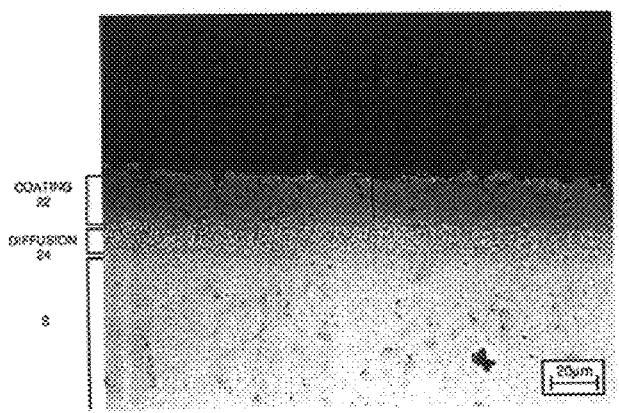 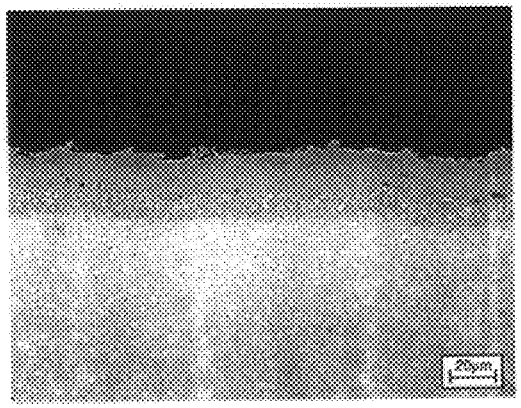
Figure 4A.
Rene' 142
MDC 210
Before Molten Caustic
Figure 4B.
Rene' 142
MDC 210
After Molten Caustic

REMOVAL OF THERMAL BARRIER COATINGS

FIELD OF THE INVENTION

The present invention relates to removal of thermal barrier protective coatings and, more particularly, to rapid chemical removal of such thermal barrier coatings by ambient pressure, elevated temperature hydroxide medium.

BACKGROUND OF THE INVENTION

Advancements in propulsion technologies have required gas turbine engines to operate at higher temperatures. This increase in operating temperature has required subsequent advancements in the operating temperatures of metal gas turbine engine components, such as superalloy turbine blades and vanes. To meet these requirements, thermal barrier coatings comprising alumina or zirconia based ceramics have provided an insulative layer protecting the superalloy substrate. To apply protective ceramic coatings, a superalloy substrate is first coated with a metallic bondcoat, such as a diffusion aluminide and/or MCrAlY overlay coating (where M is nickel and/or cobalt). This bondcoat is then coated with an insulative layer of alumina or stabilized zirconia.

During thermal barrier coating production and/or turbine engine component refurbishment, removal of the ceramic insulating layer may be necessary. Thermal barrier coatings traditionally have been removed by grit blasting, HF cleaning, water jet, or caustic autoclave chemical removal at high pressures and temperatures. These operations: are energy intensive, require long processing times, are labor intensive, damage underlying bondcoats, decrease component wall thickness, and increase surface film cooling hole sizes in multi-passage air-cooled component.

It is an object of the present invention to provide a method for removal of a thermal barrier coating rapidly and without damage to an underlying metallic substrate, such as a gas turbine engine component for example, or any bondcoat thereon.

It is another object of the present invention to provide a method for removal of a thermal barrier coating rapidly and without damage to an underlying metallic substrate or any bondcoat thereon using a hydroxide medium at ambient pressure and elevated temperature.

It is another object of the present invention to provide a thermal barrier recoated component that exhibits improved resistance to oxidation following removal of the used thermal barrier coating pursuant to the present invention and recoating with a fresh thermal barrier coating.

SUMMARY OF THE INVENTION

The present invention provides a chemical method of removing a ceramic thermal barrier coating from substrates of a wide variety of configurations at ambient pressure and in very short times as compared to prior art techniques described above without damage to the substrate or any bondcoat thereon.

In an illustrative embodiment of the present invention, the component having the thermal barrier coating is immersed in an inorganic hydroxide bath having a high concentration of alkali or alkaline earth hydroxide with the bath at ambient (atmospheric) pressure and elevated temperature for a time sufficient to effect detachment of the thermal barrier coating from a substrate by preferential attack of an intermediate oxide layer and removal from the substrate. The hydroxide bath can comprise an inorganic hydroxide liquid bath having at least about 50 weight %, preferably at least 80 weight %, of an alkali or alkaline earth hydroxide and the balance essentially water.

For purposes of illustration and not limitation, the inorganic hydroxide bath can comprise 90 weight % KOH and 10 weight % water at 650 degrees F. disposed in a vessel open to atmospheric pressure. The component having the thermal barrier coating thereon can be immersed in the hydroxide bath and then optionally immersed in a water bath to remove the thermal barrier coating without damage to the substrate or any bondcoat present thereon.

In a particular illustrative embodiment, the hot component is removed from the caustic bath after a selected time and immersed in a water bath whereby the water bath is heated by the hot component and agitated to facilitate removal of any remaining thermal barrier coating from the substrate.

The present invention provides a thermal barrier recoated component that exhibits improved resistance to oxidation following removal of the used thermal barrier coating pursuant to the present invention and recoating with a fresh thermal barrier coating. By virtue of removal of the used thermal barrier coating in the aforementioned caustic bath, the alkali or alkaline earth element of the caustic bath remains on and/or in the surface of the stripped component in a detectable amount and becomes incorporated into the bondcoat or substrate, if no bondcoat is present, when the fresh thermal barrier coating is applied to the stripped component in an amount effective to increase oxidation resistance of the recoated component.

The above and other objects and advantages of the present invention will become more readily apparent from the following drawings taken in conjunction with the following detailed description.

DESCRIPTION OF THE DRAWINGS

FIGS. 2A and 2B are photomicrographs at 500× of Rene' N5 nickel base superalloy sample before immersion and after immersion in a caustic inorganic hydroxide bath pursuant to the present invention.

FIGS. 4A and 4B are photomicrographs at 500× of Rene' 142 nickel base superalloy samples coated with a CVD low activity diffusion aluminide before immersion and after immersion in a caustic inorganic hydroxide bath pursuant to the present invention.

DESCRIPTION OF THE INVENTION

The present invention involves a chemical method of removing a ceramic thermal barrier coating from a superalloy and other substrates of a wide variety of configurations at ambient pressure and in very short times without damage to the substrate or any bondcoat thereon.

Figures 3A, 3B:
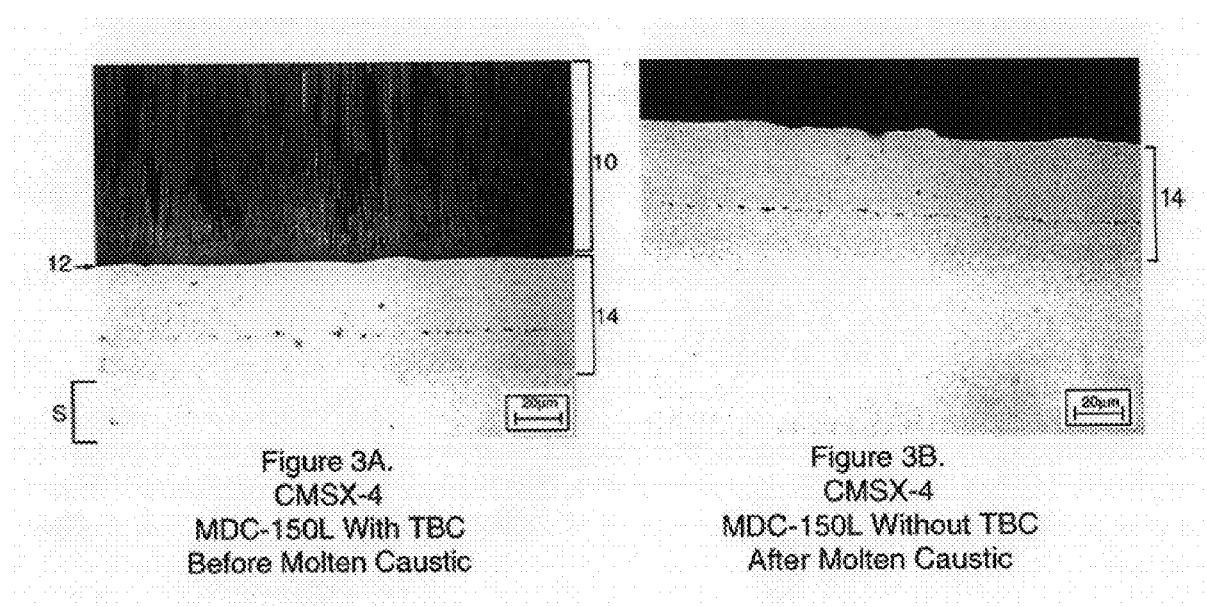
FIGS. 3A and 3B are photomicrographs at 500× of CMSX-4 nickel base superalloy samples coated with a thermal barrier coating before immersion and after immersion in a caustic inorganic hydroxide bath pursuant to the present invention.

The thermal barrier coating typically comprises an outer ceramic thermal insulating coating or layer 10 disposed on an intermediate oxide layer 12 comprising for example only, an alumina layer, chromia layer, and the like, FIG. 3A. The intermediate oxide layer 12 is formed or deposited on an inner bondcoat layer 14 which may comprise a metallic layer, such as an MCrAlY alloy overlay where M is nickel and/or cobalt, and/or a diffusion aluminide layer which may be modified by inclusion of Pt or other precious metal(s) and other elemental additions, such as reactive metals including Si, Hf, Y, and/or Zr and alkali and alkaline earth metals, such as K and Mg.

The intermediate layer can be formed by oxidation of the bondcoat by heating in an oxidizing atmosphere to thermally grow the layer thereon as a thin oxide layer. Alternately, the intermediate layer can be deposited by chemical vapor deposition on the bondcoat as a thin layer of ceramic material.

The MCrAlY layer can be deposited on the substrate S by plasma spray, flame spraying, electron-beam-physical vapor deposition, sputtering and other known techniques. The diffusion aluminide layer can be formed on the substrate by chemical vapor deposition (CVD), pack cementation, above-the-pack, slurry and other known deposition techniques. The bondcoat layer typically ranges in thickness from about 1 mil to about 10 mils, such as about 5 to about 8 mils for MCrAlY and about 1 to about 3 mils for diffusion aluminide, for purposes of illustration and not limitation. If the substrate comprises an alumina forming alloy, the bondcoat may be omitted, or alumina may be applied to the substrate as a layer sans bondcoat.

The outer thermal insulating layer comprises a ceramic material such as zirconia, alumina, and others known for use as thermal barrier layers. The ceramic thermal barrier material may be modified to include other ceramic materials such as yttria, ceria, scandia, magnesia, and similar materials. The thermal insulating layer may be a graded layer that changes composition from the outer free surface thereof to the inner surface thereof proximate the next inner layer (e.g. intermediate layer or bondcoat) or the substrate. The thermal insulating layer typically is applied or deposited by air plasma spray or electron beam physical vapor deposition (EB PVD) at suitable elevated substrate coating temperatures. When applied by EB PVD, the thermal insulating layer exhibits a microstructure of columnar grains extending generally perpendicular to the bondcoat and substrate surface, FIG. 3A. The thermal insulating layer typically ranges in thickness from about 2 mils to about 20 mils for purposes of illustration only.

The substrate S can comprise nickel, cobalt or iron base superalloys in cast or wrought form commonly used for gas turbine engine components, such as turbine blades and vanes, nozzle guide vanes. Examples of common superalloy and other substrates to which the invention is applicable include, but are not limited to, single crystal and directionally solidified superalloys such as CMSX-4, PWA-1484, Rene' N5, Rene' 142, PWA-1480, and CM-186LC and other high temperature polycrystalline alloys such as Rene' 80, GTD-111 and IN-738 for purposes of illustration only. The substrate can have a wide variety of configurations such as complex turbine blade and vane shapes, simple flat or curvilinear shapes, and other myriad shapes.

Thermal barrier coatings, as discussed or mentioned herein, are well known and described in such patents as U.S. Pat. Nos. 4,405,659; 4,676,994; 5,015,502; 5,514,482 and 5,716,720 for example.

Pursuant to an embodiment of the invention, an engine-run or other thermal barrier coated component, such as a superalloy turbine blade, vane and other component, is subjected to a refurbishment or repair operation wherein the thermal barrier coating 10 is removed from the component (substrate) without significant chemical attack or other damage to the component substrate or any bondcoat 14 thereon by a chemical removal method at ambient pressure and in very short times as compared to prior art techniques described above without damage to the substrate or any bondcoat thereon.

In an illustrative embodiment of the present invention, the component having the used thermal barrier coating 10 is immersed in an inorganic hydroxide liquid bath having a high concentration of alkali or alkaline earth hydroxide, such as KOH, NaOH, $Ca(OH)_2$, $Mg(OH)_2$ with the bath at ambient (atmospheric) pressure and elevated temperature, such as for example only at about 275 degrees F. and above, for a time sufficient to effect detachment of the thermal barrier coating 10 for removal from the substrate and bondcoat.

An exemplary hydroxide liquid bath comprises an inorganic hydroxide solution or liquid having at least about 50 weight %, preferably at least 80 weight %, of an alkali or alkaline earth hydroxide and the balance essentially water. For purposes of further illustration and not limitation, the inorganic hydroxide bath preferably can comprise 90 weight % KOH and 10 weight % water at 650 degrees F. disposed in a vessel open to atmospheric pressure. Water is added to the bath as necessary during use to replenish water lost by evaporation. The component having the thermal barrier coating 10 thereon can be immersed in the bath for a short time (e.g. about 15 seconds to several minutes) to detach the thermal barrier coating, via preferential chemical attack/dissolution of the intermediate oxide layer 12 located between the bondcoat and the thermal barrier coating, without damage to the substrate or any bondcoat present thereon and then immersed in the water bath to remove any minor thermal barrier coating clinging to the substrate and any bondcoat present thereon. In particular, the hot component is removed from the hot caustic bath after a selected time and immersed in a water bath whereby the water bath is heated by the hot component and boiled/agitated to facilitate removal of any remaining, clinging thermal barrier coating from the substrate.

The present invention was demonstrated using a beaker (capacity of one liter) disposed on a laboratory bench in air wrapped in a Kaowool thermal insulation inner blanket and an outer wrapping of aluminum foil. A thermocouple was inserted between the beaker and the thermal insulation to monitor temperature of the caustic bath.

A watch glass was placed on the top of the beaker to permit viewing of the thermal barrier coating removal process. The beaker was filled with a metal hydroxide flake, particularly hydrated KOH flake (90% KOH-10% water by weight), and was heated by electrical resistance to produce a molten bath at 650 degrees F. The thermal barrier coated samples described below were submerged in the molten KOH bath until the thermal barrier coating started to fragment and peel off the part by virtue of preferential chemical attack or dissolution of the alumina or other oxide layer 12 located between the bondcoat and thermal barrier coating, removing substantially all of the thermal barrier coating. At this point in the process, the hot part was removed from the molten KOH bath and rinsed in a room temperature water bath by immersion therein. The hot component caused localized boiling of water in contact therewith and facilitated removal of remaining minor amount of thermal barrier coating which had not previously fallen off the part in the bath.

Figure 1A:
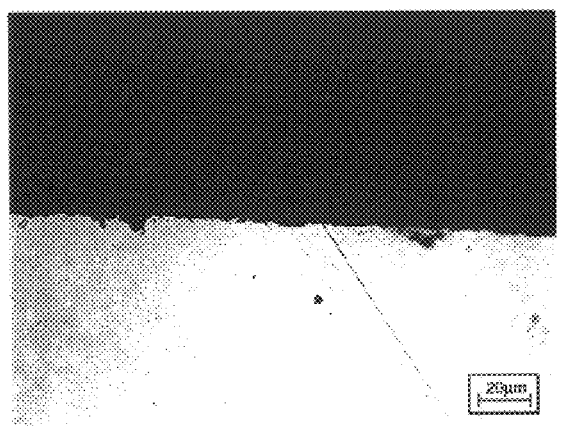
FIGS. 1A and 1B are photomicrographs at 500× of CMSX-4 nickel base superalloy samples before immersion and after immersion in a caustic inorganic hydroxide bath pursuant to the present invention.
Figure 1B:
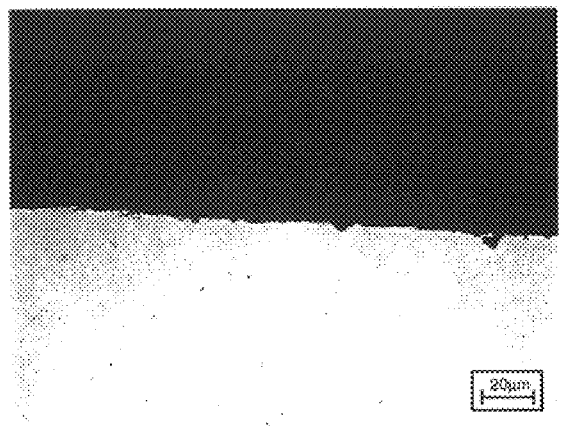

The chemical removal procedure was conducted on numerous substrate alloys. In particular, a first test was performed using CMSX-4, PWA-1484, and Rene' N5 substrate samples without any coating to determine effect of the above molten KOH bath (90% KOH-10% water by weight) in air on the substrates. The base alloy samples were submerged in the molten KOH bath for 9 minutes and then rinsed in room temperature water as described above. FIGS. 1A and 1B are photomicrographs at 500× of CMSX-4 nickel base superalloy samples before immersion and after immersion in the molten KOH bath. FIGS. 2A and 2B are photomicrographs at 500× of Rene' N5 nickel base superalloy sample before immersion and after immersion in the molten KOH bath. These Figures indicate that there was no harmful base metal attack from the treatment. The same results were obtained using uncoated PWA-1484 base metal samples.

The chemical removal procedure also was conducted on CMSX-4 substrate alloy (a solid turbine blade) samples coated with a yttria stabilized zirconia thermal barrier coating of about 0.005 inch thickness and a bondcoat of platinum modified diffusion aluminide designated MDC-150L described in U.S. Pat. No. 5,716,720 having a thickness of about 0.002 inch. One sample was submerged for approximately two minutes in the above molten KOH bath (90% KOH-10% water by weight) in air and then rinsed in the water bath. The other sample was submerged in the above molten KOH bath in air for 15 minutes to further investigate the effect of the molten KOH bath on attack of the bondcoat. FIGS. 3A and 3B are photomicrographs at 500× of CMSX-4 nickel base superalloy samples coated with a thermal barrier coating before immersion and after immersion in the molten bath. Removal of the thermal barrier coating 10 without base metal attack or bondcoat attack is evident from these Figures.

The chemical removal procedure also was conducted on a Rene' 142 substrate alloy (a hollow turbine blade) sample coated with a CVD low activity diffusion aluminide designated MDC 210 having a total thickness of about 0.001 inch (1 mil). The low activity diffusion coating comprises an additive NiAl outer layer 22 and an inner refractory element rich diffusion zone 24 adjacent substrate S. The sample was submerged for approximately nine minutes in the above molten KOH bath (90% KOH-10% water by weight) in air and then rinsed in the water bath. FIGS. 4A and 4B are photomicrographs at 500× of the Rene' 142 sample coated with the CVD low activity aluminide coating before immersion and after immersion in the molten KOH bath. These Figures indicate that there was no harmful attack of the simple aluminide diffusion coating by the treatment.

The present invention also involves a thermal barrier recoated component that exhibits improved resistance to oxidation following removal of the used thermal barrier coating pursuant to the present invention and recoating with a fresh thermal barrier coating. In particular, by virtue of removal of the used thermal barrier coating in the aforementioned caustic bath, the alkali or alkaline earth element of the caustic bath has been discovered to remain on the surface of the stripped component (either on the bondcoat or on the superalloy substrate if no bondcoat is present) in a detectable amount and to become incorporated in the bondcoat (or superalloy substrate) when the fresh thermal barrier coating is applied to the stripped component at elevated temperature in an amount effective to increase oxidation resistance of the bondcoat (or superalloy substrate) and thus the recoated component having the thermal barrier coating thereon. The bondcoat, if present can comprise an aluminide, MrCrAlY, or other bondcoat.

For purposes of illustration, two separate sets of samples were involved in the above chemical removal procedure to demonstrate that the alkali or alkaline earth element of the caustic bath remains on the surface of the stripped component. In particular, one set of samples included CF6-80C2 first stage turbine blades that were made of Rene' N5 superalloy and that are designed by he engine manufacturer to be air cooled in service by internal serpentine passages with numerous surface film cooling holes. The other set of samples included one inch diameter buttons comprised of Rene' N5 superalloy.

Two different CVD low activity platinum diffusion aluminide coatings were used in this demonstration. Namely, the aforementioned turbine blade samples were Pt electroplated in a KOH electroplating solution as described in Ser. No. 08/685,379, issued as U.S. Pat. No. 5,788,823, aluminized by CVD low activity as described in U.S. Pat. No. 5,568,614 to provide a platinum modified diffusion aluminide coating having a thickness of 0.0025 inch, and thermal barrier coated as described in U.S. Pat. No. 5,716,720 to provide a yttria stabilized zirconia thermal barrier coating having a thickness of 0.005 inch on the aluminide bondcoat. The intermediate alumina layer 12 was formed by high temperature exposure to an oxidizing atmosphere.

The aforementioned button samples were Pt electroplated as described in U.S. Pat. No. 3,677,789 using a phosphate electroplating bath and CVD aluminized as described in U.S. Pat. No. 5,658,614 to form a platinum modified diffusion aluminide coating having a thickness of 0.0025 inch. No TBC coating was applied to the aluminide coating.

The coatings on the turbine blade samples already contained potassium from the potassium hydroxide Pt plating process, and so, were not suitable samples to show potassium pick-up by the above chemical removal procedure for removing the thermal barrier coating.

One coated turbine blade sample and one coated button sample were submerged for approximately 7 minutes in the above molten KOH caustic bath (90 weight % KOH and 10 weight % water) at 650 degrees F. in air and then rinsed in the water bath. Then, the stripped turbine blade sample was recoated with a fresh yttria stabilized zirconia thermal barrier coating (TBC) as described above.

A coated turbine blade sample without the above caustic bath chemical removal treatment (i.e. having the original TBC coating thereon) and with the above caustic bath chemical removal treatment and recoated with the fresh yttria stabilized zirconia TBC coating were oxidation tested at 2075 degrees F. using one hour cycles with each cycle comprising 50 minutes at temperature and 10 minutes air cooling. Spalling of 20% of the TBC coating was defined as failure in this testing. The coated turbine blade sample with the above caustic bath chemical removal treatment and recoated with the fresh TBC coating exhibited more than a 4 times improvement in life in the oxidation test in comparison with the aforementioned non-KOH treated and TBC coated blade.

Figure 5:
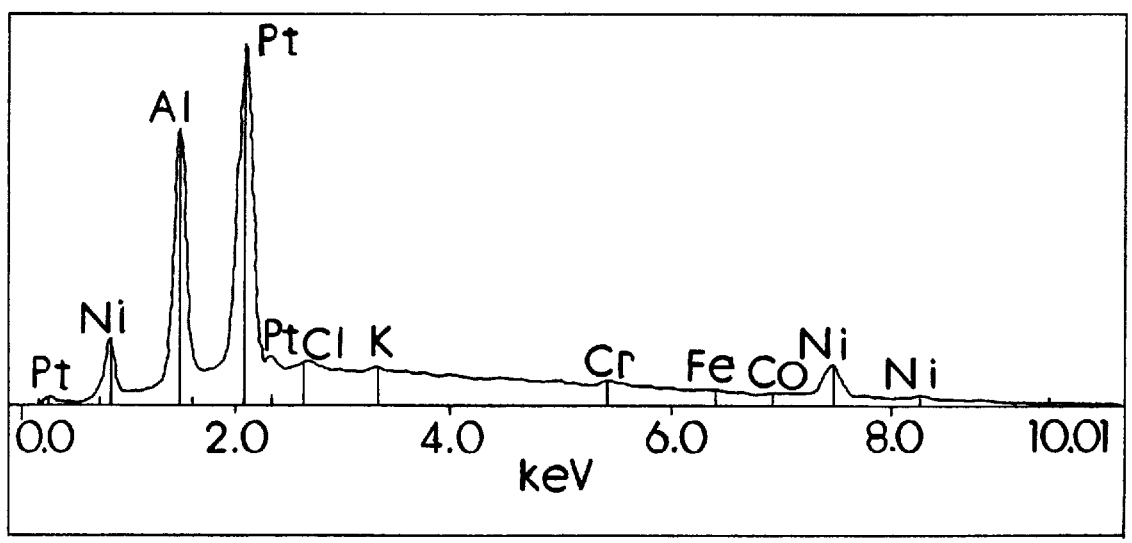
FIG. 5 is an X-ray spectra of the surface of a platinum modified diffusion aluminide surface of a Rene' N5 button sample after immersion in a molten caustic KOH bath.

Following the above caustic bath chemical removal treatment, the surface of the Rene' N5 button samples were examined for potassium pickup using an energy dispersive X-ray spectrometer (EDS) on a scanning electron microscope (SEM). FIG. 5 is the resulting EDS spectra for a sample and demonstrates detectable potassium pickup on and/or in the platinum modified diffusion aluminide from the hot KOH treatment bath. In view of the teachings of Ser. No. 08/685,379, issued as U.S. Pat. No. 5,788,823, an improvement in the oxidation resistance of the platinum modified diffusion aluminide bond coating and thus the TBC coated blade is expected from the incorporation of potassium in the aluminide coating during the hot KOH chemical removal treatment pursuant to the present invention and after TBC coating thereof at elevated temperature.

The present invention is advantageous to remove ceramic thermal barrier coatings from superalloy and other substrates of a wide variety of configurations at ambient pressure and in very short times without detectable or harmful damage to the substrate or any bondcoat thereon. The process is economical with process cycle times generally less than a few minutes and low capital cost for equipment. The invention can replace traditional thermal barrier coating removal processes such as water jet, shot peening, HF cleaning, and caustic autoclave treatment with substantially shorter cycle times (e.g. a few minutes of the invention versus 8 hours for caustic autoclave) without the energy intensive and manual labor requirements for these methods. Moreover, the present invention provides a thermal barrier recoated component that exhibits improved resistance to oxidation following removal of the used thermal barrier coating pursuant to the present invention and recoating with a fresh thermal barrier coating.

Although the invention has been described in detail above with respect to certain embodiments, those skilled in the art will appreciate that modifications, changes and the like can be made therein without departing from the spirit and scope of the invention as set forth in the appended claims.

We claim:

1. A method of removing a thermal barrier coating from a substrate, comprising contacting a thermal barrier coated substrate with an inorganic caustic liquid comprising at least one of alkali hydroxide and alkaline earth hydroxide with said liquid at ambient pressure and elevated temperature to chemically attack an intermediate layer between said thermal barrier coating and said substrate to effect detachment of said thermal barrier coating from said substrate.

2. The method of claim 1 wherein said caustic liquid preferentially attacks said intermediate layer between the thermal barrier coating and the substrate.

3. The method of claim 1 wherein said intermediate layer comprises an intermediate oxide layer between the thermal barrier coating and a metallic bondcoat on the substrate such that said thermal barrier coating is detached from said bondcoat, leaving said bondcoat on said substrate.

4. The method of claim 3 wherein said intermediate layer comprises alumina or chromia.

5. The method of claim 1 wherein the caustic liquid comprises at least 50 weight % of an alkali or alkaline earth hydroxide and the balance essentially water.

6. The method of claim 5 wherein the caustic liquid comprises about 90 weight % of molten alkali or alkaline earth hydroxide and the balance essentially water.

7. The method of claim 1 wherein the caustic liquid is at a temperature of at least about 275 degrees F.

8. The method of claim 1 wherein the thermal barrier coating is contacted with the caustic liquid for 15 seconds or more.

9. The method of claim 1 further including the step of contacting the substrate with water at a lower temperature than the temperature of said caustic liquid following the step of contacting with said caustic liquid.

10. The method of claim 1 wherein the thermal barrier coated substrate is immersed in a said caustic liquid contained in a vessel open to ambient atmosphere.

11. The method of claim 1 wherein at least one of an alkali element and alkaline earth element from the caustic liquid remains on a surface of the substrate or a bondcoat thereon after the thermal barrier coating is removed.

12. The method of claim 11 including the further step of coating the substrate or the bondcoat thereon after removal of the thermal barrier coating with a fresh thermal barrier coating so that said at least one of alkali and alkaline earth element is incorporated in the substrate or the bondcoat.

* * * * *

UNITED STATES PATENT AND TRADEMARK OFFICE
CERTIFICATE OF CORRECTION

PATENT NO : 6,132,520

DATED : October 17, 2000

INVENTOR(S): John E. SCHILBE, et al.

It is certified that error appears in the above-identified patent and that said Letters Patent is hereby corrected as shown below:

Column 8, line 26; delete "a".

Signed and Sealed this

Twenty-second Day of May, 2001

*Attest:*

NICHOLAS P. GODICI

*Attesting Officer*   *Acting Director of the United States Patent and Trademark Office*